May 2, 1933.　　　F. NALLINGER　　　1,907,262
SPRING SUSPENSION
Filed Oct. 16, 1930　　　2 Sheets-Sheet 1
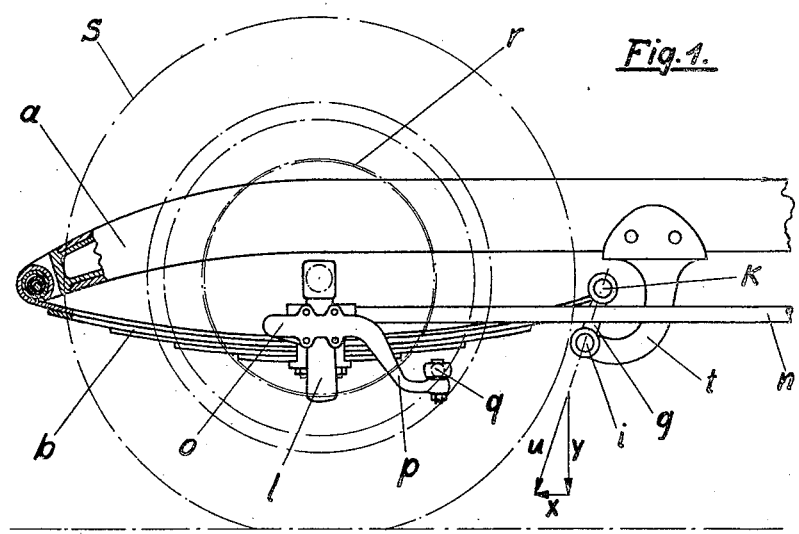
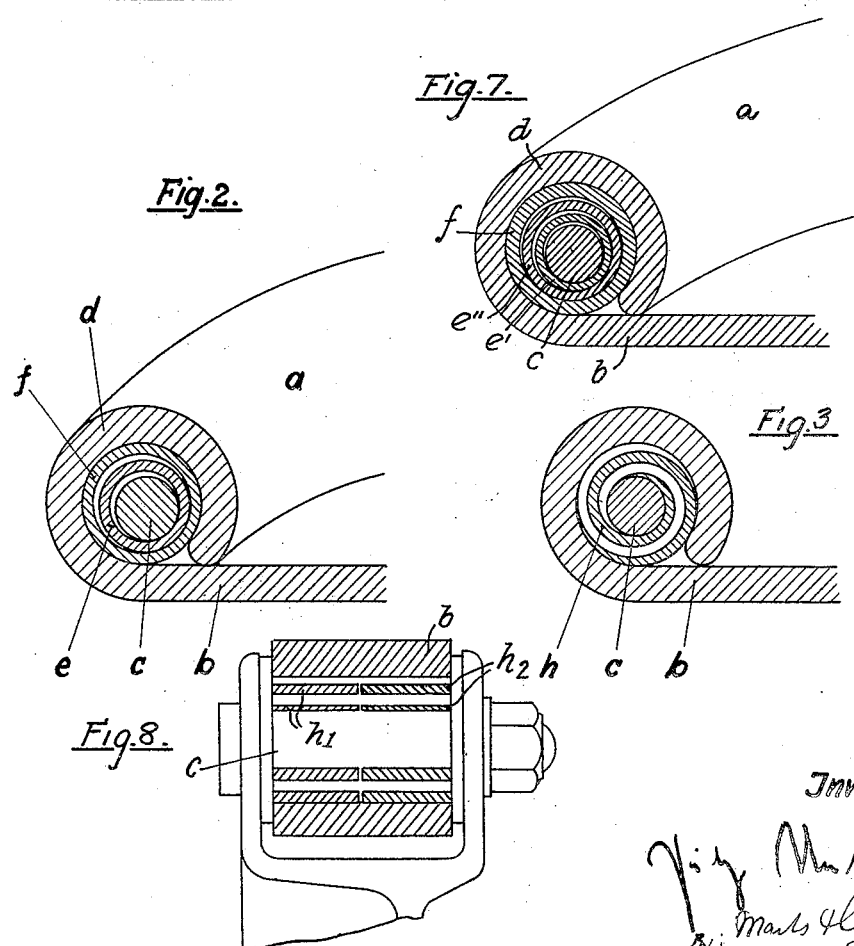
Inventor Patented May 2, 1933

1,907,262

UNITED STATES PATENT OFFICE

FRITZ NALLINGER, OF STUTTGART-UNTERTURKHEIM, GERMANY, ASSIGNOR TO DAIMLER-BENZ AKTIENGESELLSCHAFT, OF STUTTGART-UNTERTURKHEIM, A COMPANY OF GERMANY

SPRING SUSPENSION

Application filed October 16, 1930, Serial No. 489,184, and in Germany October 22, 1929.

This invention relates to means for eliminating the unsteadiness (shimmy) of the steering wheels of automobile vehicles, having longitudinal suspension springs which sometimes arises when travelling fast over ground that is not absolutely plane, owing to the deflection of the springs.

In order to eliminate this phenomenon various devices have been proposed for preventing jolts acting on the wheels from reacting on the suspension springs in such a manner that shimmy occurs.

For instance the connection of the springs with the frame has been so constructed that one link or shackle is supported by springs in relation to the frame, before and behind its point of suspension, so that the link is always urged into the position of equilibrium.

The present invention is distinguished from this device by the fact that for the purpose of facilitating the longitudinal displacement, one end of a spring is yieldingly connected with the longitudinal bearer and the other end of the spring is attached to the longitudinal bearer by a mechanical system which opposes the longitudinal displacement of the spring. The invention may be so constructed that in the joint which connects the front end of the spring with the vehicle frame one or more bushes are inserted, which are loose on all sides, and that the other end of the spring is connected with the longitudinal bearer by an upstanding rearwardly inclined shackle.

The loosely inserted bushes render possible a longitudinal displacement without noise for example in consequence of the layer of oil remaining between the surfaces. The rearwardly inclined shackle on the other end of the spring, in consequence of the resolution of forces counteracts the rearward displacement of the spring or of the axle and tends to keep the latter always in a definite position. A special advantage arises owing to the omission of the compensating springs of known devices, which, in consequence of the small space available, are short and therefore comparatively hard. Frequent replacement of these springs will also be necessary.

A further feature of the invention consists in the fact that the ends of the bearing springs are attached to the frame by a suspension system in which, during the stretching of the spring, the component directed towards the axle increases to an extent corresponding to the deflection. In this way an exceedingly advantageous effect is obtained, in that the counteracting force increases according to the magnitude of the shocks occurring and of the deflection associated therewith. In the case of constructions hitherto known the resolution of the forces is fundamentally different from that of the arrangement of the suspension system according to the present invention.

Instead of the bushes loosely inserted in one joint of the spring, one or more spiral springs may be provided, which are inserted in such a way that a displacement of the spring is possible.

As compared with known devices the present invention is particularly distinguished by better action and greater reliability.

Two constructional examples of the invention are illustrated in the accompanying drawings, in which Figure 1 shows diagrammatically in side elevation a front axle with front springs and vehicle frame, Figure 2 shows in section on a larger scale the pivotal connection of one end of the spring with the vehicle frame, bushes being loosely inserted, Figure 3 shows the same joint with spiral springs in place of the loose bushes, Figure 4 shows the resolution of forces in the case of a spring suspension with a hanging shackle, and Figure 5 shows the resolution of forces in the case of a spring suspension with an upstanding shackle.

Fig. 7 shows a constructional form having a plurality of concentric bushes loosely inserted, and Fig. 8 shows an arrangement having two spiral springs arranged side by side.

Figure 6:
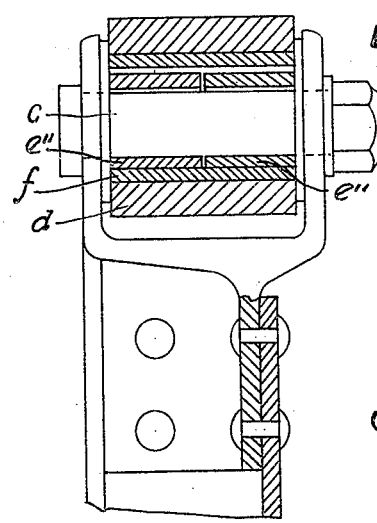
Fig. 6 shows an arrangement having two loosely inserted bushes side by side.

To the front axle $l$ are pivoted in the usual manner the axle journals, not shown. One axle journal is connected with the steering swivel $o$ and a lever $p$ of known constructional form. To the steering swivel $o$ is pivoted a steering rod $n$, and to the levers $p$ of the two steering swivels a gauge rod $q$. The brake drums $r$ and the front wheels $s$ are indicated in outline by dot and dash lines. Upon the front axle $l$ are mounted the springs $b$ by which the frame $a$ is suspended. The ends $d$ of the springs embrace spring bolts $c$ mounted on the frame. Between the members of the joint are inserted one or more loose bushes $e$ (Fig. 2) or $e$, $e'$ (Fig. 7). At the rear end the springs are connected with the frame by upstanding shackles, that is to say, the relatively movable points of attachment of the shackles to the springs are located above the relatively fixed pivotal points on the curved frame members $t$. The shackles $g$ are inclined backwards. The bushes $e$ inserted with clearance may alternatively be replaced by one or more spiral springs $h$ (Fig. 3), or $h_1$, $h_2$ (Fig. 8) which may be arranged side by side or one in the other. The bushes also may be divided transversely, as shown in Fig. 6.

Figure 4:
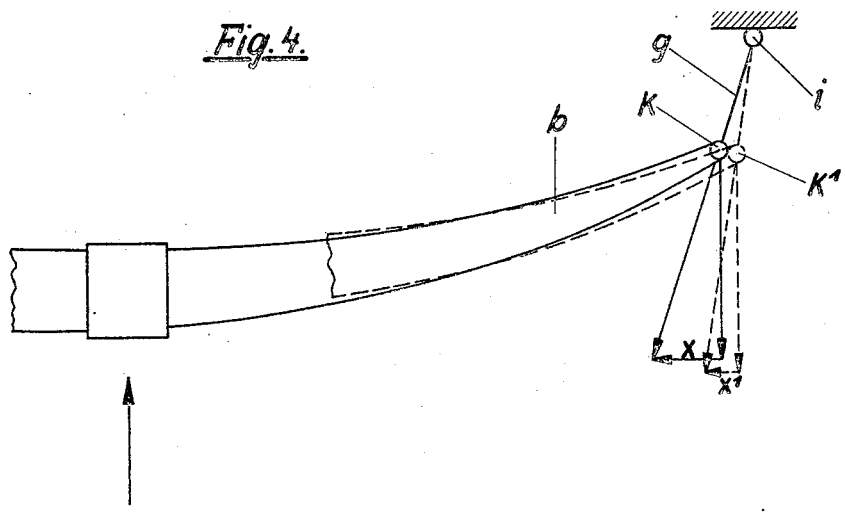
Figure 5:
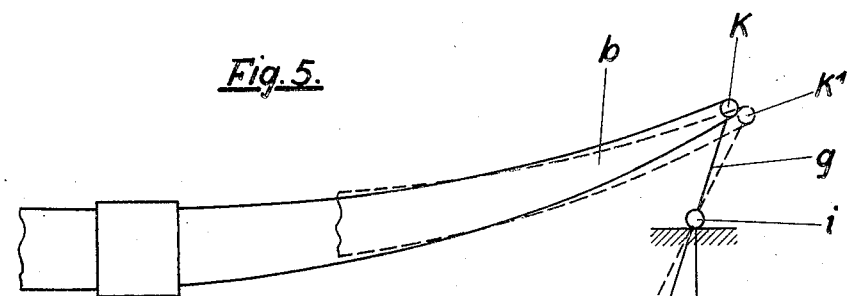

The resolution of forces in the case of hanging and of upstanding shackles is illustrated in Figs. 4 and 5 respectively.

According to Figure 4 the pivotal point $i$ about which the shackle $g$ relatively swings is secured directly in a known manner to the frame. The shackle is arranged hanging down and the end of the spring $b$ is attached by the joint $k$ to the shackle. If shocks occur with this arrangement in the direction of the arrow for example, the spring $b$ is straightened and the joint $k$ travels towards $k^1$. The position that the spring occupies under normal loading is shown in full lines. The forces acting upon the shackle $g$ may then be resolved for instance along the sides of the triangle of forces drawn in Fig. 4. The component $x$ acts against the axle and has a definite magnitude. Upon a shock occurring the spring assumes the dot and dash position. The component $x^1$, as the drawings show, is in this position somewhat smaller than in the position of normal loading. From this it follows that the magnitude of the component decreases with the increase in the deflection of the spring. The component $x$ is accordingly a minimum upon the occurrence of the greatest shocks. The problem of the invention, however, is to prevent the displacement of the axle rearwards from the central plane. Consequently it is necessary that the forces occasioning the displacement should be counteracted by forces of corresponding magnitude.

The system according to the known constructions, in which the contrary is the case, does not solve this problem.

The action of the system according to the present invention will be immediately obvious from Figure 5. The same reference letters are used for the same parts as in Figure 4. Round the stationary pivotal point $i$ swings the shackle $g$. The latter, as contrasted with Figure 4, is arranged in an upstanding position and the end of the spring $b$ is again attached at $k$ to this shackle. The spring and the shackle assume the position shown in full lines under normal loading. When shocks occur the spring comes for example into the dot and dash position. Now from a consideration of the forces brought into play, it will be seen that the magnitude of the component $x^1$ increases with an increase in the shocks. The result of the forces in the direction towards the axle is therefore adapted, in the case of the arrangement according to Fig. 5, which corresponds to the present invention, to urge the axle always into a definite position, since the magnitude of the counteracting force increases with the magnitude of the shocks. In Figure 1 the force acting in the direction of the upstanding shackle $g$ is denoted by $u$, the vertical component of the force $u$ by $y$, and the component directed oppositely to the rearward displacement of the front axle by $x$.

What I claim is:—

1. The combination with a motor vehicle frame, a steering wheel for the vehicle, a longitudinal suspension spring for resiliently supporting said frame on the steering wheel, a pivot on the frame for connecting the spring at one end to the vehicle, of an eye on the spring at the end thereof, said eye encircling the pivot with clearance, and cushioning means interposed between said eye and pivot for enabling said end of the spring to move longitudinally on deflection of the spring and yielding attaching means for the other end of the spring for enabling said other end to move longitudinally on deflection of the spring, said attaching means comprising a link connected to the said other end of the spring and to the vehicle frame so as to extend at an inclination to the latter to produce a force component opposing the longitudinal movement of the end of the spring connected thereto and increasing in magnitude with the magnitude of deflection of the spring.

2. The combination with a motor vehicle frame, a steering wheel for the vehicle, a longitudinal suspension spring for resiliently supporting said frame on the steering wheel, a pivot on the frame for connecting the spring at one end to the vehicle and yielding attaching means connected to the vehicle and to the other end of the spring so as to enable said other end to move longitudinally on deflection of the spring, of an eye on the spring at the end thereof remote from the yielding attaching means said eye encircling the pivot with clearance, and an annular metallic bush housed in said eye with clearance between the eye and the bush and surrounding the pivot with clearance, so as to be capable of rolling relatively to the inner surface of the said eye and relatively to the surface of the pivot.

3. The combination with a motor vehicle frame, a steering wheel for the vehicle, a longitudinal suspension spring for resiliently supporting said frame on the steering wheel, a pivot on the frame for connecting the spring at one end to the vehicle and yielding attaching means connected to the vehicle and to the other end of the spring so as to enable said other end to move longitudinally on deflection of the spring, of an eye on the spring at the end thereof remote from the yielding attaching means said eye encircling the pivot with clearance, and cushioning means interposed between said eye and pivot for enabling this latter end of the spring also to move longitudinally on deflection of the spring, said cushioning means comprising a plurality of metallic bushes of annular cross-section surrounding the pivot with clearance and inserted with clearance in the spring eye, so as to be capable of rolling relatively to the inner surface of the said eye and relatively to the surface of the pivot.

4. The combination with a motor vehicle frame, a steering wheel for the vehicle, a longitudinal suspension spring for resiliently supporting said frame on the steering wheel, a pivot on the frame for connecting the spring at one end to the vehicle and a link connected to the vehicle and to the other end of the spring so as to extend upwardly and rearwardly from the frame and enable said other end to move longitudinally on deflection of the spring, of an eye on the spring at the end thereof remote from the yielding attaching means, said eye encircling the pivot with clearance, and cushioning means interposed between said eye and pivot for enabling this latter end of the spring also to move longitudinally on deflection of the spring, said cushioning means comprising a spiral spring surrounding the pivot.

5. The combination with a motor vehicle frame, a steering wheel for the vehicle, a longitudinal suspension spring for resiliently supporting said frame on the steering wheel and a pivot on the frame, of an eye on the front end of the spring encircling said pivot with clearance, cushioning means interposed between said eye and pivot for enabling the front end of the spring to move longitudinally on deflection of the spring and a link connected to the rear end of the spring and to the vehicle frame so as to extend upwardly and rearwardly from the frame.

6. The combination with a motor vehicle frame, an axle, steering wheels connected to the axle, a pair of longitudinal suspension springs connected to the axle, one on each side of the vehicle, for supporting the frame on the axle, pivots mounted one on each side of the vehicle frame, for connecting the springs at one end to the frame, and links pivoted to the vehicle frame, one on each side thereof, and to the other end of the spring on the respective side of the vehicle, of eyes on the end of the springs remote from the said links, said eyes encircling the respective pivots on the vehicle frame with clearance, and cushioning means comprising annular metal members interposed between said eyes and pivots with play between said metal members and said eyes and pivots and between the metal members themselves.

7. The combination with a motor vehicle frame, a steering wheel for the vehicle, a longitudinal suspension spring for resiliently supporting said frame on the steering wheel, a pivot on the frame for connecting the spring at one end to the vehicle and yielding attaching means connected to the vehicle and to the other end of the spring so as to enable said other end to move longitudinally on deflection of the spring, of an eye on the spring at the end thereof remote from the yielding means, said eye encircling the pivot with clearance, and cushioning means interposed between said eye and pivot for enabling this latter end of the spring also to move longitudinally on deflection of the spring, said cushioning means comprising a plurality of bushes arranged side by side to surround the pivot with clearances serving for the reception of layers of oil.

8. The combination with a motor vehicle frame, a steering wheel for the vehicle, a longitudinal suspension spring for resiliently supporting said frame on the steering wheel, a pivot on the frame for connecting the spring at one end to the vehicle and yielding attaching means connected to the vehicle and to the other end of the spring so as to enable said other end to move longitudinally on deflection of the spring, of an eye on the spring at the end thereof remote from the yielding means, said eye encircling the pivot with clearance, and cushioning means interposed between said eye and pivot for enabling this latter end of the spring also to move longitudinally on deflection of the spring, said cushioning means comprising a plurality of spiral springs arranged side by side to surround the pivot.

9. The combination with a motor vehicle frame, a wheel for the vehicle, a suspension spring for resiliently supporting said frame on the wheel and a pivot on the frame for connecting the spring at one end to the vehicle, of an eye on the spring at the said end thereof, said eye encircling the pivot with clearance, and a metallic bush housed within the eye with a clearance between the bush and the eye and between the bush and the pivot, so as to be capable of rolling relatively to the inner surface of the eye and relatively to the surface of the pivot.

In testimony whereof I affix my signature.

FRITZ NALLINGER.